US007992016B2

(12) United States Patent
Araki

(10) Patent No.: US 7,992,016 B2
(45) Date of Patent: Aug. 2, 2011

(54) DATA TRANSMITTER WITH AN ELECTRIC POWER DISTRIBUTION UNIT DISTRIBUTES ELECTRIC POWER FROM RADIO SIGNAL RECEIVED FROM EXTERNAL DEVICE AND TRANSMITS INFORMATION IN RADIO SIGNAL

(75) Inventor: Katsuhiko Araki, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 133 days.

(21) Appl. No.: 12/465,338

(22) Filed: May 13, 2009

(65) Prior Publication Data

US 2010/0083014 A1 Apr. 1, 2010

(30) Foreign Application Priority Data

Sep. 30, 2008 (JP) ................................. 2008-254503

(51) Int. Cl.
*G06F 1/00* (2006.01)

(52) U.S. Cl. ...................................... 713/300; 713/320

(58) Field of Classification Search .................. 713/300, 713/320
See application file for complete search history.

(56) References Cited

U.S. PATENT DOCUMENTS

| 7,411,607 B2 * | 8/2008 | Kikugawa .................. 348/207.2 |
| 2004/0210691 A1 * | 10/2004 | Fujii .............................. 710/74 |

FOREIGN PATENT DOCUMENTS

| JP | 2002-084685 | | 3/2002 |
| JP | 2006-217125 | * | 8/2006 |
| JP | 2007013749 | | 1/2007 |
| JP | 2007-072767 | * | 3/2007 |
| JP | 2007-249305 | | 9/2007 |

\* cited by examiner

*Primary Examiner* — Chun Cao
(74) *Attorney, Agent, or Firm* — Blakely, Sokoloff, Taylor & Zafman LLP

(57) ABSTRACT

According to one embodiment, a data transmitter includes a radio receiver, a power distributor, a storage module, a radio transmitter, and a power supply. The radio receiver receives a radio signal from an external device. The power distributor distributes power from the radio signal received by the radio receiver. The storage module stores information and is supplied with the power distributed by the power distributor to be readable when no power is supplied from a main power supply. The main power supply supplies power to the entire data transmitter. The radio transmitter is supplied with the power distributed by the power distributor and transmits the information read from the storage module as a radio signal to the external device. The power supply is capable of switching power to be supplied between the power distributed by the power distributor and the power supplied from the main power supply.

8 Claims, 5 Drawing Sheets

DATA TRANSMITTER WITH AN ELECTRIC POWER DISTRIBUTION UNIT DISTRIBUTES ELECTRIC POWER FROM RADIO SIGNAL RECEIVED FROM EXTERNAL DEVICE AND TRANSMITS INFORMATION IN RADIO SIGNAL

CROSS-REFERENCE TO RELATED APPLICATIONS

This application is based upon and claims the benefit of priority from Japanese Patent Application No. 2008-254503, filed Sep. 30, 2008, the entire contents of which are incorporated herein by reference.

BACKGROUND

1. Field

One embodiment of the invention relates to a data transmitter that transmits data to an external device.

2. Description of the Related Art

With the improvement in networking technology, there is a tendency that various types of electronic devices are designed to be compatible with networks. Besides, electronic devices are often connected to one another to set up a network environment at home.

An electronic device connected to a network is required to be active to communicate data with another electronic device. The electronic device consumes more power when active, resulting in higher power costs. Therefore, there has been applied a technology capable of switching electronic devices between standby and active modes. That is, an electronic device is activated only when data is received from another device, a predetermined condition is satisfied (for example, the electronic device is turned on with a remote controller), and the like.

With such a technology, however, the data storage device is activated every time data is transmitted, even if the data volume is low. Consequently, considerable amount of power is still consumed.

Accordingly, Japanese Patent Application Publication (KOKAI) No. 2006-217125 has proposed a technology in which an electronic device can communicate data even in the standby mode. Thus, the electronic device need not be activated for each data transmission and consumes less power.

Regardless of the use of the technology as described above, an electronic device is ON even in the standby mode and consumes more or less power. Although the electronic device consumes less power in the standby mode than in the active mode, it consumes some power if left ON for a long time. When a plurality of electronic devices are connected via a network, they consume substantial power altogether.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, a data transmitter comprises a radio receiver, a power distributor, a main power supply, a storage module, a radio transmitter, a use information storage module, a transmitter, and a power supply. The radio receiver is configured to receive a radio signal from an external device. The power distributor is configured to distribute power from the radio signal received by the radio receiver. The main power supply is configured to supply power to the entire data transmitter. The storage module is configured to store information and be supplied with the power distributed by the power distributor to be readable when no power is supplied from the main power supply. The radio transmitter is configured to be supplied with the power distributed by the power distributor and transmit the information read from the storage module as a radio signal to the external device. The use information storage module is configured to store use information used by the external device and be readable while the main power supply supplies the power. The transmitter is configured to transmit the use information read from the use information storage module to the external device in either a wireless or wired manner while the main power supply supplies the power. The power supply is configured to switch power to be supplied between the power distributed by the power distributor and the power from the main power supply.

Figure 1:
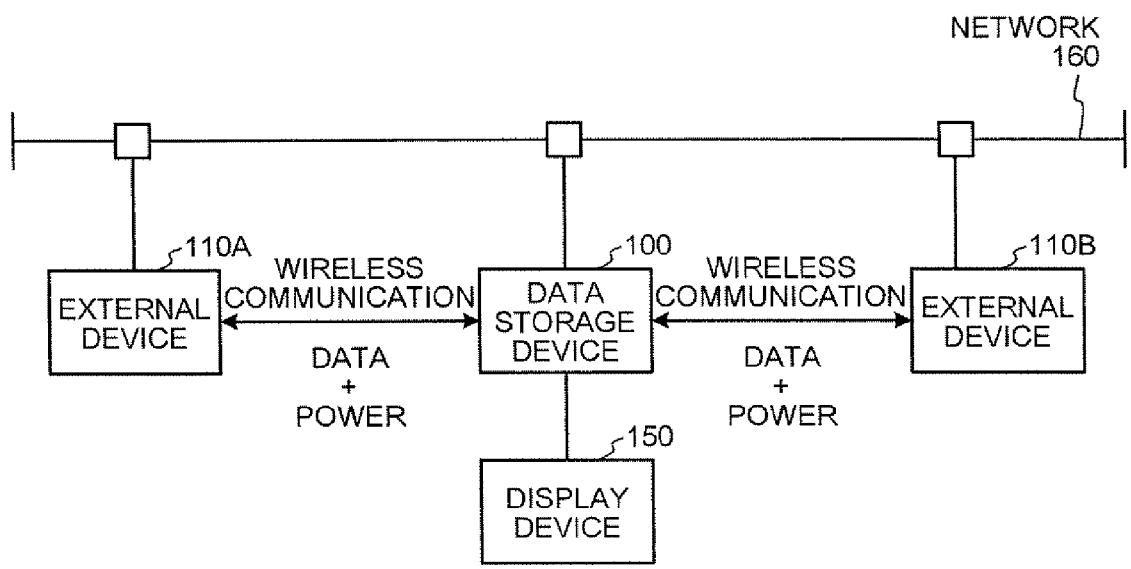
FIG. 1 is an exemplary schematic diagram of a network configuration including a plurality of external devices and a data storage device according to an embodiment of the invention.

FIG. 1 is a schematic diagram of a network configuration including a data storage device 100 and a plurality of external devices 110A and 110B according to an embodiment of the invention. The data storage device 100 is connected to a display device 150. The data storage device 100 stores data such as contents.

The display device 150 displays data received from the data storage device 100. Examples of data received from the data storage device 100 include the status information of the data storage device 100 and a list of contents.

The external devices 110A and 110B are, for example, televisions or personal computers (PCs) having a function of reproducing recorded content (program) provided via a network from the data storage device 100. The external devices 110A and 110B may be any device capable of using content provided by the data storage device 100. Examples of the external devices 110A and 110B include an electronic device compatible with the digital living network alliance (DLNA) and a portable electronic device.

The external devices 110A and 110B are each provided with an antenna or the like for wireless communication. With this, the external devices 110A and 110B can exchange data with the data storage device 100.

The external devices 110A and 110B are each capable of supplying power to the data storage device 100 using electromagnetic induction of a carrier wave transmitted wirelessly. Incidentally, the external devices 110A and 110B may supply power to the data storage device 100 in a wireless manner through any technology including commonly known ones.

The external devices 110A and 110B are connected to the data storage device 100 via a wired network 160. The data storage device 100 provides content to the external devices 110A and 110B through the network 160. Examples of the content include a moving image and music. While, in the embodiment, such content is described as being provided via the wired network 160, it may be provided via wireless communication. It is assumed that data can be communicated faster through the wired network 160 than through a wireless network. Thus, a large volume of content can be provided.

When receiving content from the data storage device 100 or the like, the external devices 110A and 110B transmit a carrier wave for power transmission and data to the wireless communication port of the device. Examples of the data transmitted to the wireless communication port include a device ID that specifies the data storage device 100 or the like, and a command for controlling the data storage device 100 or the like.

The device ID identifies a device (for example, the data storage device 100) that provides the content. The command is an instruction or information recognizable by the device identified by the device ID.

As just described, since the external devices 110A and 110B transmit a device ID with a command, a device identified by the device ID can be controlled by the command. Among the examples of the command for controlling a device is a request for a list of contents stored in the device. By transmitting such a command to a device such as the data storage device 100, the external devices 110A and 110B can obtain from the device a list of contents stored therein.

Although, in the embodiment, two external devices are illustrated in the network, there may be one or three or more external devices in the network.

Figure 2:
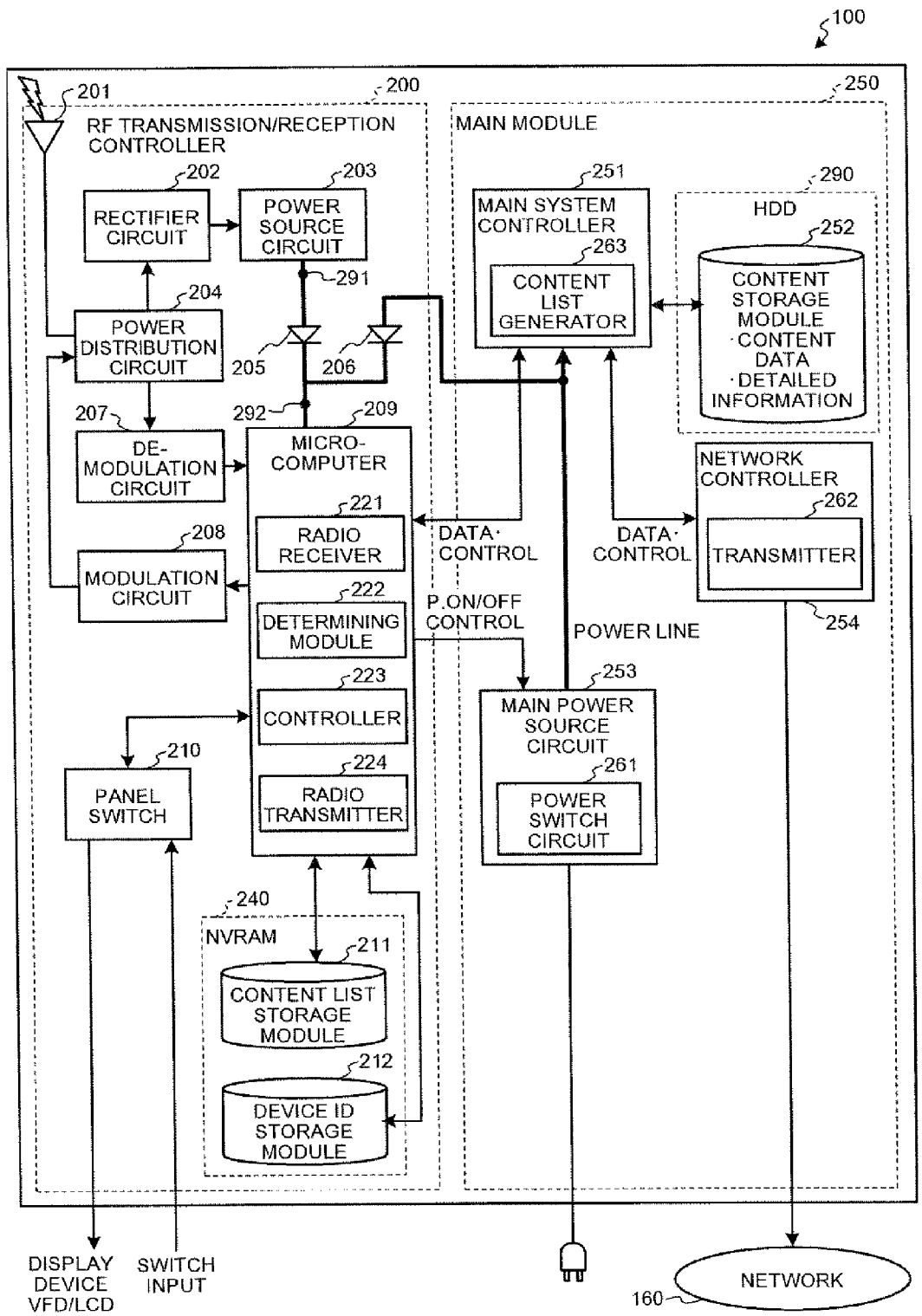
FIG. 2 is an exemplary block diagram of the data storage device in the embodiment.

FIG. 2 is a block diagram of the data storage device 100. As illustrated in FIG. 2, the data storage device 100 comprises an RF transmission/reception controller 200 and a main module 250.

The data storage device 100 is provided with P.OFF mode and P.ON mode as modes related to power supply thereto. In the P.ON mode, the data storage device 100 is supplied with power from the outside via a wire, and the power is fed to the entire data storage device 100. In the P.OFF mode, the data storage device 100 is in standby, and standby power is cut so that the power consumption is zero.

The RF transmission/reception controller 200 comprises an antenna 201, a rectifier circuit 202, a power source circuit 203, a power distribution circuit 204, diodes 205 and 206, a demodulation circuit 207, a modulation circuit 208, a microcomputer 209, a panel switch 210, a content list storage module 211, and a device ID storage module 212. Even in the P.OFF mode, if supplied with power from a carrier wave received by the antenna 201, the data storage device 100 performs predetermined processing. The RF transmission/reception controller 200 is provides with a non-volatile random access memory (NVRAM) 240 including the content list storage module 211 and the device ID storage module 212.

The antenna 201 performs wireless communication with a device capable of wireless communication such as the external devices 110A and 110B. Through the wireless communication, the antenna 201 receives a radio input signal from the external devices 110A and 110B. The radio input signal includes a carrier wave for power supply, a device ID, and a command for controlling the device. In the following, a description will be given of the case where the antenna 201 receives a radio input signal from the external device 110A.

The same is true in the case where the antenna 201 receives a radio input signal from other external devices (for example, the external device 110B).

The antenna 201 also transmits a radio output signal to the external devices 110A and 110B. Among the examples of the radio output signal is a response signal to the command.

The power distribution circuit 204 distributes power from a radio input signal received by the antenna 201. The power distribution circuit 204 may be, for example, a Wilkinson power divider circuit. Having passing through the power distribution circuit 204, the radio input signal is distributed to a power generation path and a data reception path.

The term "power generation path" as used herein refers to a communication path from the power distribution circuit 204 through the rectifier circuit 202 to the power source circuit 203. On the other hand, the term "data reception path" as used herein refers to a communication path from the power distribution circuit 204 through the demodulation circuit 207 to the microcomputer 209.

The rectifier circuit 202 performs RF-to-DC conversion to convert the radio input signal passing from the power distribution circuit 204 on the power generation path into a direct current.

In the embodiment, the power source circuit 203 includes, for example, a DC power source. The power source circuit 203 receives the direct current from the rectifier circuit 202, and converts it to a voltage capable of activating the constituent elements of the RF transmission/reception controller 200. The power source circuit 203 then supplies power to the constituent elements. The power is supplied to, for example, the microcomputer 209, and the content list storage module 211 and the device ID storage module 212 in the NVRAM 240.

The power supply from the power source circuit 203 activates the microcomputer 209 as well as the content list storage module 211 and the device ID storage module 212. This allows reading of information stored in the content list storage module 211 and the device ID storage module 212.

That is, the NVRAM 240 is a nonvolatile memory that is readable when supplied with power from the power source circuit 203 without power supply from a main power source circuit 253.

The content list storage module 211 stores information on a list of contents or the like (hereinafter, "content list information"). The content list information includes information items necessary for a user to select content that he/she desires to reproduce, such as title, format, resolution, copy protection (CP) information, and time. The content list storage module 211 also stores as the content list information, in addition to the information on contents, information necessary to view or record content such as recording schedule information. The content list information is transmitted to the external devices 110A and 110B to allow a search for reproducible content and check of content programmed to be recorded. The information items of the content list information are determined by the trade-off between data transfer time and data volume.

The device ID storage module 212 stores the device ID that identifies the data storage device 100. The device ID is used to determine whether a command contained in a radio input signal is directed to the data storage device 100.

The diode 205 rectifies the current from the power source circuit 203. On the other hand, the diode 206 prevents a current inflow from the power source circuit 203, and lets current from the main power source circuit 253 flow into the microcomputer 209.

The demodulation circuit 207 receives a radio input signal modulated by a modulation scheme, such as amplitude shift keying (ASK), frequency shift keying (FSK), or phase shift keying (PSK), and transmitted. The demodulation circuit 207 demodulates the radio input signal to generate a data reception signal. The demodulation circuit 207 then outputs the data reception signal to the microcomputer 209.

The microcomputer 209 comprises a radio receiver 221, a determining module 222, a controller 223, and a radio transmitter 224, and controls the overall operation of the RF transmission/reception controller 200. Further, the microcomputer 209 performs radio transmission/reception control and power control through the constituent elements described above.

The microcomputer 209 is supplied with power from the power source circuit 203 when a radio input signal is received by the antenna 201. Thus, the microcomputer 209 can operate even in the P.OFF mode in which the main power source circuit 253 stops power supply.

The radio receiver 221 receives the data reception signal that has been converted from the radio input signal by the demodulation circuit 207. The data reception signal contains a device ID and a command for controlling a corresponding device, which allows the microcomputer 209 to perform processing using them.

The determining module 222 determines whether the device ID contained in the data reception signal received by the radio receiver 221 matches that stored in the device ID storage module 212.

When the determining module 222 determines that both the device IDs match, the controller 223 performs processing according to the command contained in the data reception signal. For example, if the command is a request for a content list, the controller 223 reads content list information from the content list storage module 211. The controller 223 outputs the content list information to the radio transmitter 224 as well as instructing the radio transmitter 224 to transmit it to the sender of the radio input signal, i.e., the external device 110A.

When the determining module 222 determines that both the device IDs match and the command requires activation of the entire system of the data storage device 100 as, for example, a request for content reproduction, the controller 223 returns a necessary response to the external device 110A.

More specifically, having determined that the command requires activation of the system when the data storage device 100 is in the P.OFF mode, the controller 223 outputs a power ON signal to the main power source circuit 253. In response to the power ON signal, the main power source circuit 253 supplies power to the entire data storage device 100. After the power-on sequence is completed in the main module 250 of the data storage device 100, the radio transmitter 224, which will be described later, notifies the external device 110A of this completion. Thus, the transmission/reception of content data starts.

When the determining module 222 determines that both the device IDs match, the radio transmitter 224 performs processing so that the content list information read from the content list storage module 211 is to be transmitted to the external device 110A as a radio output signal. Accordingly, after being modulated by the modulation circuit 208, the content list information is transmitted from the antenna 201 to the external device 110A as a radio output signal.

The modulation circuit 208 modulates input transmission data, such as content list information, by a modulation scheme such as ASK, FSK, or PSK, and generates a radio output signal. The radio output signal thus generated is transmitted from the antenna 201 to the external device 110A.

The panel switch 210 receives input of information provided from a user by operating a switch or the like. The panel switch 210 outputs the information to the microcomputer 209 so that the microcomputer 209 can perform processing according to the user operation.

The panel switch 210 also controls the display device 150 to display the information in response to a request from the microcomputer 209.

As described above, according to the embodiment, a radio input signal received by the antenna 201 is distributed, and the power source circuit 203 supplies the power within the RF transmission/reception controller 200. Thus, the data storage device 100 can transmit content list information or the like to the external devices 110A and 110B.

Since power is distributed from a radio input signal, the power source circuit 203 supplies less power than the main power source circuit 253 does. Therefore, the power source circuit 203 is configured to supply power to the minimum necessary constituent elements (for example, the microcomputer 209 and the NVRAM 240) to transmit information stored in the NVRAM 240 to the external device 110A or 110B. This enables information to be transmitted to the external device 110A or 110B upon receipt of a radio input signal therefrom and also no power to be consumed during the waiting period for a radio input signal. Incidentally, if supplied with no power from the main power source circuit 253, the antenna 201 is capable of receiving a radio input signal and transmitting a radio output signal.

On the other hand, if a process needs the use of constituent elements in addition to the RF transmission/reception controller 200 as, for example, when information such as content stored in a hard disk drive (HDD) 290 is transmitted to the external devices 110A and 110B, power supply from the main power source circuit 253 is required. When determining that power needs to be supplied from the main power source circuit 253, the controller 223 of the microcomputer 209 outputs a power ON signal (P.ON control signal) to the main power source circuit 253. In response to the power ON signal, the main power source circuit 253 supplies power to the entire data storage device 100. This enables various types of processing.

Described below is the configuration of the main module 250. The main module 250 comprises a main system controller 251, a content storage module 252, the main power source circuit 253, and a network controller 254. The main module 250 performs various types of processing while supplied with power from the main power source circuit 253.

The main power source circuit 253 comprises a power switch circuit 261, and supplies power to the entire data storage device 100 from the outside via a wire. The main power source circuit 253 may supply power to the entire data storage device 100 using at least one of a built-in power supply, an AC adaptor, and a secondary battery such as a lithium-ion battery.

The power switch circuit 261 switches the state of the main power source circuit 253 between supplying or not supplying power to the entire data storage device 100 according to a power ON/OFF signal from the microcomputer 209. The power ON/OFF signal is received according to the processing result of the microcomputer 209.

When the power switch circuit 261 allows the main power source circuit 253 to supply power to the entire data storage device 100, the data storage device 100 enters the P/ON mode from the P/OFF mode. Then, the main power source circuit 253 supplies power to the entire data storage device 100. Thereafter, the main power source circuit 253 supplies power to the constituent elements of the RF transmission/reception controller 200, let alone those of the main module 250.

The HDD 290 comprises the content storage module 252, and has a larger capacity than the NVRAM. 240. Although HDD is used as a storage medium in the embodiment, any commonly used storage medium, such as an optical disc or a memory card, may be used. The HDD 290 is active and is readable and writable only when supplied with power from the main power source circuit 253.

The content storage module 252 stores content data in association with detailed information of content. The detailed information of content is information related to the content such as metadata. In this manner, the content storage module 252 stores all information about the content. The content storage module 252 also stores, in addition to the information on the content, information necessary to view or record content such as recording schedule information.

The main system controller 251 comprises a content list generator 263. While supplied with power from the main power source circuit 253, the main system controller 251 controls the overall operation of the main module 250.

The content list generator 263 extracts information necessary for content list information from the detailed information of content and the information necessary to view or record content such as recording schedule information stored in the content storage module 252. The content list generator 263 then generates content list information based on the extracted information. Thereafter, the content list generator 263 instructs the microcomputer 209 to update content list information stored in the content list storage module 211. According to the instruction, the microcomputer 209 updates the content list information stored in the content list storage module 211 with that generated by the content list generator 263. In this manner, the content list information stored in the content list storage module 211 corresponds to the content data and the like stored in the content storage module 252.

Figure 3:
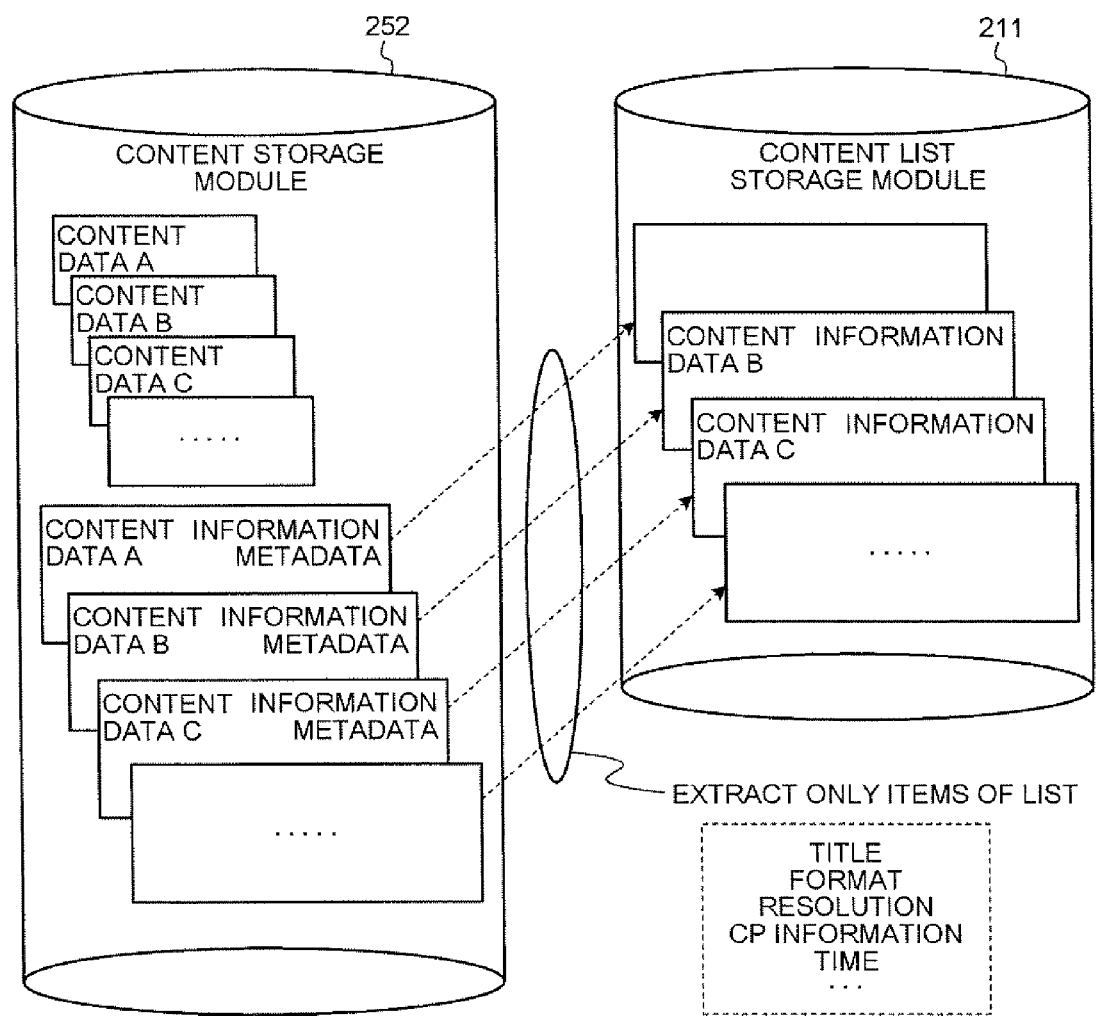
FIG. 3 is an exemplary schematic diagram for explaining the operation of a content list generator in the embodiment.

FIG. 3 is a schematic diagram for explaining how to update content list information stored in the content list storage module 211 based on detailed information stored in the content storage module 252. As illustrated in FIG. 3, the content list generator 263 specifies items that can be referred to as content list information. The items are specified based on items that a user needs to select content and the volume of data to be transmitted. In the embodiment, the items include title, format, resolution, CP information, and time.

Referring back to FIG. 2, the network controller 254 comprises a transmitter 262. While supplied with power from the main power source circuit 253, the network controller 254 controls data transmission/reception to/from the external devices 110A and 110B via the wired network 160.

The transmitter 262 transmits data to the external devices 110A and 110B. Examples of the data transmitted by the transmitter 262 include content data stored in the content storage module 252.

As described above, while power is supplied from the main power source circuit 253, the data storage device 100 can provide content data stored in the content storage module 252 to the external devices 110A and 110B.

Moreover, upon receipt of a request for transmission of a content list and a request for reproduction of content from a plurality of external devices, respectively, the antenna 201 and the network controller 254 of the data storage device 100 can transmit content list information and content data to the external devices appropriately.

Figure 4:
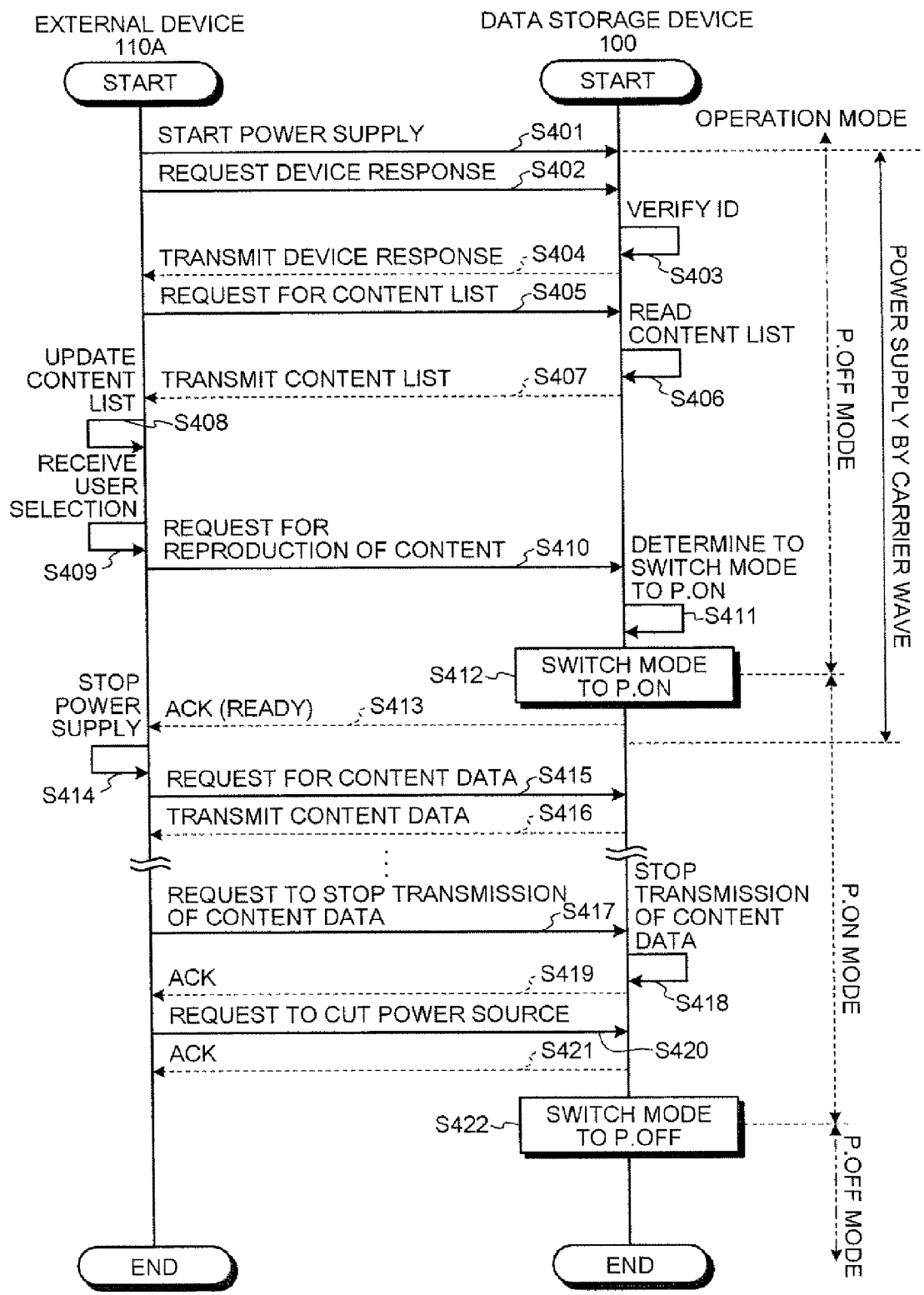
FIG. 4 is an exemplary sequence diagram of a process performed by an external device and the data storage device in the embodiment.

A description will then be given of a process performed by the external device 110A and the data storage device 100. FIG. 4 is a sequence diagram of the process performed by the external device 110A and the data storage device 100. It is herein assumed that the data storage device 100 is in the P.OFF mode in its initial state, where all constituent elements are inactive and consume no power.

First, the external device 110A starts power supply to the data storage device 100 by a carrier wave of a radio input signal (S401). This activates the constituent elements in the RF transmission/reception controller 200 of the data storage device 100. The external device 110A continues the power supply until notified that the data storage device 100 is ready (for example, until S413).

Then, the external device 110A transmits a radio input signal containing a device ID to the data storage device 100 as a request for a device response (S402).

When the radio receiver 221 of the microcomputer 209 in the data storage device 100 receives the device ID, the determining module 222 determines whether the device ID matches the one stored in the device ID storage module 212 (S403). FIG. 4 illustrates the case where these device IDs match. If the device IDs do not match, the data storage device 100 notifies the external device 110A of this event, and the process ends.

On the other hand, when the determining module 222 determines that the device IDs match, the radio transmitter 224 transmits a device response indicating that the device ID is verified (S404). After being modulated by the modulation circuit 208, the device response is transmitted from the antenna 201 to the external device 110A as a radio output signal. Upon receipt of the radio output signal, the external device 110A regards this as a response from the data storage device 100 that stores content.

The external device 110A then transmits a radio input signal containing a command to request for a content list (S405).

Having received the radio input signal, the controller 223 of the data storage device 100 reads content list information from the content list storage module 211 according to the command extracted from the radio input signal (S406).

Subsequently, the radio transmitter 224 transmits the content list information (S407). After being modulated by the modulation circuit 208, the content list information is transmitted from the antenna 201 to the external device 110A as a radio output signal.

Thus, the external device 110A obtains the content list information, and updates content list information with the received one (S408). The external device 110A then outputs or displays the update content list information to the user.

The external device 110A receives input from the user to select content from the content list information (S409).

Thereafter, the external device 110A transmits a radio input signal, which contains a command to request for reproduction of the content, to the data storage device 100 (S410).

When the request for reproduction of the content is received while the data storage device 100 is in the P.OFF mode, the controller 223 of the microcomputer 209 determines to switch the mode to the P.ON mode (S411).

Accordingly, the controller 223 outputs a power ON signal to the main power source circuit 253. In response to the power ON signal, the power switch circuit 261 switches the P.OFF mode to the P.ON mode. With this, the main power source circuit 253 starts power supply (S412).

After that, the radio transmitter 224 of the microcomputer 209 transmits an ACK signal (READY) indicating that content data is ready to be reproduced (S413). After being modulated by the modulation circuit 208, the ACK signal is transmitted from the antenna 201 to the external device 110A as a radio output signal. Upon receipt of the radio output signal, the external device 110A determines that the content data is ready to be reproduced, and stops the power supply by a carrier wave (S414).

The external device 110A transmits a request for the content data to the data storage device 100 (S415). The request for the content data may be transmitted as a radio input signal or may be transmitted via the network 160.

In response to the request, the main system controller 251 of the data storage device 100 reads the content data from the content storage module 252, and the network controller 254 transmits the content data (S416). Then, the data storage device 100 continues to transmit the content data to the external device 110A.

The external device 110A requests the data storage device 100 to stop transmitting the content data (S417). In response to the request, the data storage device 100 stops reading the content data from the content storage module 252, and terminates the transmission of the content data (S418). Thereafter, the data storage device 100 transmits to the external device 110A an ACK signal indicating the acceptance of the request to stop transmitting the content data (S419).

The external device 110A transmits a request to cut the power source to the data storage device 100 (S420).

In response to the request, the controller 223 of the microcomputer 209 instructs the main module to shut down. After the main module shuts down, the data storage device 100 transmits to the external device 110A an ACK signal indicating that the power source has been cut off (S421).

The controller 223 then disables the power ON signal. As a result, in the data storage device 100, the power switch circuit 261 of the main power source circuit 253 switches the P.ON mode to the P.OFF mode (S422).

In the manner as described above, the data storage device 100 can provide content list information even in the P.OFF mode in which no power is consumed. Moreover, the data storage device 100 enters the P.ON mode as required, and thus can provide content data.

Figure 5:
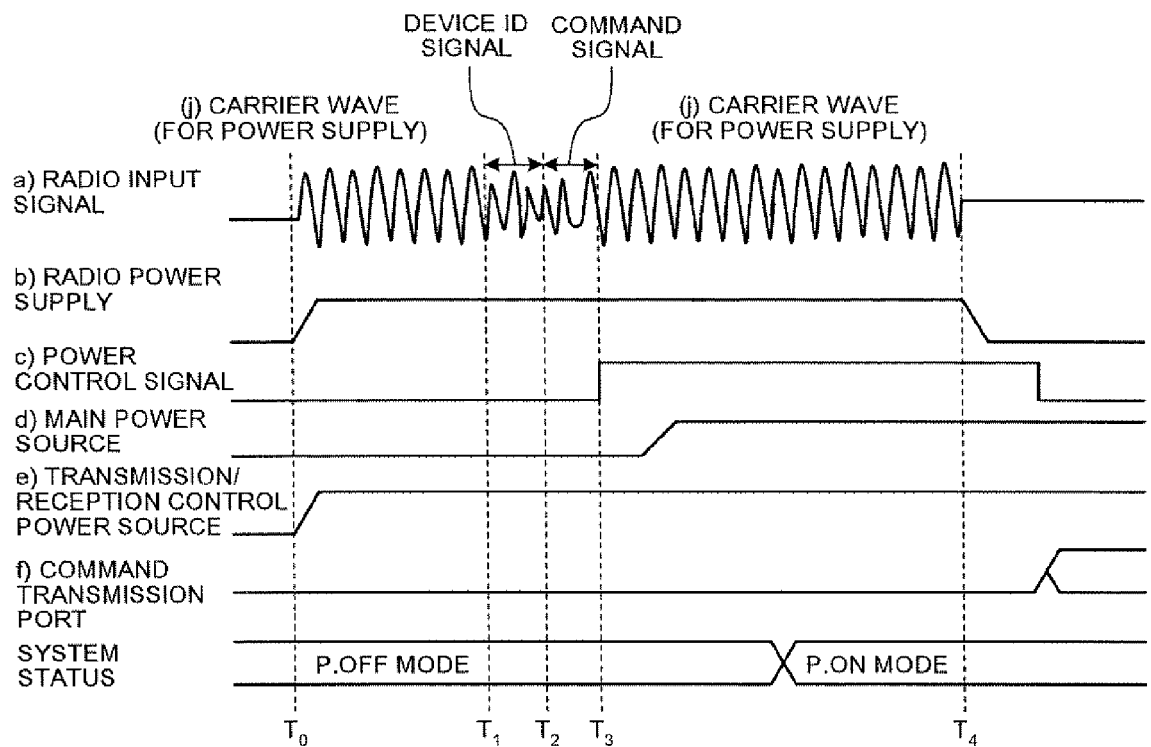
FIG. 5 is an exemplary schematic diagram of the timing of various signals in the data storage device in the embodiment.

The timing of various signals will then be described. FIG. 5 illustrates an example of the timing of various signals. Incidentally, FIG. 5 does not illustrate the timing of receiving a command to request a content list and the timing of transmitting content list information in response to the request.

As indicated by a) and (j) in FIG. 5, it is assumed that the antenna 201 receives a radio input signal with a carrier wave for power supply from time $T_0$.

Accordingly, as indicated by b), the power source circuit 203 starts power supply (radio power supply). This power is measured, for example, at a point 291 in FIG. 2. The power supplied from the power source circuit 203 increases the voltage as indicated by e) transmission/reception control power source, i.e., the power source of the RF transmission/reception controller 200. This power is measured, for example, at a point 292 in FIG. 2.

Then, the antenna 201 receives a radio input signal containing a device ID from time $T_1$.

After the device ID is verified, the antenna 201 receives a radio input signal containing a command signal from time $T_2$. In response to the command signal, the controller 223 of the microcomputer 209 outputs a power ON signal (power control signal) from time $T_3$ as indicated by c).

In response to the power ON signal, the main power source circuit 253 starts power supply. Accordingly, as indicated by d) the voltage of the main power source (the main power source circuit 253) increases. After the voltage of the main power source reaches a predetermined value, the system status changes from the P.OFF mode to the P.ON mode.

The data storage device 100 transmits to the external device 110A a signal indicating that the provision of content data or the like becomes available. Thereafter, the external device 110A stops the power supply by a carrier wave at time $T_4$. At this point, since the main power source circuit 253 supplies power, as indicated by e) transmission/reception control power source, the RF transmission/reception controller 200 is continuously supplied with power.

At the same time, the main module 250 is also supplied with power. Thus, as indicated by f) command transmission port, the network controller 254 starts communication (for example, transmission of content data) via the network 160.

Although the data storage device 100 of the embodiment is described above as transmitting content data from the transmitter 262 of the network controller 254, this is by way of example rather than limitation. Such content data may be transmitted in any other manner. For example, content data need not necessarily be transmitted via the antenna 201 of the RF transmission/reception controller 200, but may be transmitted via a wireless network or the like.

In addition, although the content storage module 252 of the embodiment is described above as storing information on content, what is stored therein is not limited to content. The content storage module 252 may store any information that can be provided to the external devices 110A and 110B and used by them. Besides, although the NVRAM 240 of the RF transmission/reception controller 200 is described above as storing content list information, this is by way of example rather than limitation. The NVRAM 240 may store any type of data required by the external devices 110A and 110B, such as document data, image data, and program data.

As described above, according to the embodiment, the data storage device 100 uses wireless power transmission, and has the constituent elements necessary to provide content information in a region where they can operate with wireless power. Thus, even when supplied with no power from a power source circuit that receives power from the outside via a wire, the data storage device 100 can provide information on content to an external device. Moreover, the power source circuit that receives power from the outside via a wire can be switched between ON and OFF based on a request from an external device.

Furthermore, in the data storage device 100, the constituent elements necessary to transmit information to an external device are located in a block to which power can be supplied by wireless power transmission using electromagnetic induction or radio waves. Thus, the system can be in standby without consuming power of the power source in the main module.

Still further, the data storage device 100 transmits content list information while in the P.OFF mode. Accordingly, an external device can obtain the content list information stored in the data storage device 100 without waking it up. Thus, the external device can efficiently obtain a list of reproducible contents, which enhances user's convenience.

Still further, the data storage device 100 transmits content list information while the power source is OFF. Accordingly, the data storage device 100 can be maintained in standby condition until it is required to actually provide content. This reduces the time during which the data storage device 100 is active (in the P.ON mode). As a result, the data storage device 100 consumes less operation power.

Still further, information on content such as a content list can be obtained in a wireless manner. Therefore, if the data storage device 100 is of a portable size, an external device can easily obtain such information on content only by bringing the data storage device 100 close to the external device.

Similarly, if an external device is a portable data storage device capable of wireless communication such as a mobile device, the external device can easily and dynamically obtain information on content only by being brought close to the data storage device 100.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A data transmitter comprising:
    a radio receiver configured to receive a radio signal from an external device;
    a power distributor configured to distribute power from the radio signal received by the radio receiver;
    a main power supply configured to supply power;
    a storage module configured to store information and be supplied with the power distributed by the power distributor to be readable when no power is supplied from the main power supply;
    a use information storage module configured to (i) store use information used by the external device and (ii) be readable while the main power supply supplies the power;
    a radio transmitter that is powered by power distributed by the power distributor and transmits the information read from the storage module as a radio signal to the external device when the main power supply is in a power-off state;
    a transmitter that is powered by the main power supply and is configured to transmit the use information read from the use information storage module to the external device in either a wireless or wired manner only when the main power supply supplies the power; and
    a power supply configured to switch power to be supplied between the power distributed by the power distributor and the power from the main power supply.

2. The data transmitter of claim 1, wherein the main power supply is configured to be switchable whether to supply the power according to a command contained in the radio signal received by the radio receiver.

3. The data transmitter of claim 1, wherein the transmitter is configured to provide faster transmission than the radio transmitter.

4. The data transmitter of claim 1, wherein
    the use information storage module is configured to store, as the use information, at least one of content information and information necessary to view and record content including recording schedule information, and
    the storage module is configured to store list information of at least one of the content information and the recording schedule information.

5. The data transmitter of claim 4, wherein the use information storage module is configured to further store detailed information used to generate the list information, the data transmitter further comprising:
    a generator configured to generate the list information to be stored in the storage module based on the detailed information stored in the use information storage module.

6. The data transmitter of claim 1, wherein no standby power is consumed while the main power supply supplies no power.

7. The data transmitter of claim 1, further comprising:
    an identification information storage module configured to store first identification information that identifies the data transmitter; and
    a determination module configured to determine whether second identification information contained in the radio signal received by the radio receiver matches the first identification information stored in the identification information storage module, wherein
    when the determination module determines that the second identification information matches the first identification information, the radio transmitter transmits the information read from the storage module to the external device.

8. The data transmitter of claim 1, wherein the radio receiver, the radio transmitter, and the transmitter are configured to communicate with a plurality of external devices.

* * * * *